US012644607B2

(12) United States Patent
Shin et al.

(10) Patent No.: US 12,644,607 B2
(45) Date of Patent: Jun. 2, 2026

(54) COOKING APPLIANCE

(71) Applicant: LG ELECTRONICS INC., Seoul (KR)

(72) Inventors: Jangmo Shin, Seoul (KR); Jeonghyun Lee, Seoul (KR); Myeongjun Shin, Seoul (KR); Hansaem Hwang, Seoul (KR); Myeongsu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 829 days.

(21) Appl. No.: 17/974,285

(22) Filed: Oct. 26, 2022

(65) Prior Publication Data

US 2023/0138859 A1 May 4, 2023

(30) Foreign Application Priority Data

Oct. 28, 2021 (KR) ........................ 10-2021-0146087
Jan. 5, 2022 (KR) ........................ 10-2022-0001821

(51) Int. Cl.
*F24C 7/06* (2006.01)
*A47J 37/06* (2006.01)
*F24C 7/08* (2006.01)

(52) U.S. Cl.
CPC ........... *F24C 7/067* (2013.01); *A47J 37/0629* (2013.01); *F24C 7/085* (2013.01)

(58) Field of Classification Search
CPC ....... A47J 37/0629; F24C 7/085; F24C 7/067; H05B 6/6482
See application file for complete search history.

(56) References Cited

U.S. PATENT DOCUMENTS

| | | | |
|---|---|---|---|
| 4,137,442 A | 1/1979 | Tateda | |
| 4,629,850 A * | 12/1986 | Tanabe | H05B 6/66 219/404 |
| 5,693,246 A | 12/1997 | Han et al. | |
| 5,747,781 A | 5/1998 | Kim et al. | |
| 11,116,348 B2 | 9/2021 | Kwon et al. | |

(Continued)

FOREIGN PATENT DOCUMENTS

| | | | | |
|---|---|---|---|---|
| EP | 2217037 A1 * | 8/2010 | ........... | H05B 6/6408 |
| JP | 2012078006 A | 4/2012 | | |
| KR | 100200780 B1 | 6/1999 | | |

(Continued)

*Primary Examiner* — Thien S Tran
(74) *Attorney, Agent, or Firm* — Bryan Cave Leighton Paisner LLP

(57) ABSTRACT

A cooking appliance including a heater that is vertically movable in a cooking chamber is proposed. The cooking appliance includes a casing having a cooking chamber therein, a door rotatably provided at one portion of the casing and opening and closing the cooking chamber, a heater provided at one portion of the casing and generating heat, a movable heater system provided at one portion of the casing and allowing the heater to be movable in the cooking chamber, and a detection function detecting whether or not the heater is brought into contact with food in the cooking chamber or is spaced apart from the food at a predetermined distance and a function of detecting recovery of the heater to the original position. With the cooking appliance, there is an advantage in that cooking efficiency is improved and malfunction or damage to parts is prevented.

15 Claims, 17 Drawing Sheets

(56)  References Cited

U.S. PATENT DOCUMENTS

2018/0092486 A1 * 4/2018 Kwon ................... A47J 27/002

FOREIGN PATENT DOCUMENTS

| | | | | |
|---|---|---|---|---|
| KR | 100213126 | B1 | 8/1999 | |
| KR | 100225624 | B1 | 10/1999 | |
| KR | 200365796 | Y1 | 10/2004 | |
| KR | 100778706 | B1 | 11/2007 | |
| KR | 1020140091844 | A | 7/2014 | |
| WO | WO-2020142285 | A1 * | 7/2020 | ............... A21B 1/48 |

* cited by examiner

COOKING APPLIANCE

CROSS REFERENCE TO RELATED APPLICATION

The present application claims priority to Korean Patent Application No. 10-2021-0146087, filed Oct. 28, 2021 and Application No. 10-2022-0001821, filed Jan. 5, 2022, the entire contents of which is incorporated herein for all purposes by this reference.

BACKGROUND OF THE INVENTION

Field of the Invention

The present disclosure relates generally to a cooking appliance including a heater vertically movable in a cooking chamber.

Description of the Related Art

A cooking appliance is provided to cook food accommodated therein by using heat of a heater provided as a heating source.

Generally, the cooking appliance includes a main body including a cooking chamber that is a space accommodating food therein, at least one heater provided in the main body, and a door rotatably coupled to the main body and closing and opening a front surface of the cooking chamber.

Recently, in order to increase the effectiveness of the cooking appliance, a steam generator as in Korean Patent Application Publication No. 10-2018-0126237 may be added to the cooking appliance.

Furthermore, in the food thawing device disclosed in U.S. Pat. No. 4,303,820, a pair of flat electrodes defining a food thawing zone is provided, and one of the pair of flat electrodes is provided to be movable for insertion of a frozen food rod. In addition, a relatively low wattage power supply device provides even energy distribution across the food load for smooth heating (thawing).

In the apparatus and method for reheating a package of refrigerated or frozen food disclosed in U.S. Pat. No. 8,258, 440, the apparatus and method for reheating a package of refrigerated or frozen food are disclosed. In addition, the heating mechanism is in conductive heat transfer contact with the food package, and heats food to a reheat temperature, and is operated for a reheat time for reheating the food package, and then is maintained at the reheat temperature if desired.

However, a link-type elevating system has been disclosed in the conventional cooking appliance, but due to the structure such as the heater descending by its own weight for thawing food, ascending and descending of the heater are not precisely performed, and a crash prevention with respect to food in the cooking appliance or original position control of the heater is insufficient. Therefore, there is a risk of leakage of electromagnetic waves in the cooking appliance and occurrence of safety accidents and failure due to product damage.

DOCUMENTS OF RELATED ART

Korean Patent Application Publication No. 10-2018-0126237
U.S. Pat. No. 4,303,820
U.S. Pat. No. 8,258,440

SUMMARY OF THE INVENTION

Accordingly, the present disclosure has been made keeping in mind the above problems occurring in the related art, and the present disclosure is intended to provide a cooking appliance with a heater moving vertically intentionally in the cooking chamber.

Furthermore, another objective of the present disclosure is to provide a cooking appliance configured to efficiently shield electromagnetic waves through perimeter of a heater system that is raised and lowered.

Furthermore, a further objective of the present disclosure is to provide a cooking appliance configured to mechanically detect interference between a raised and lowered heater and food.

In order to achieve the above objectives, according to one aspect of the present disclosure, a cooking appliance according to the present disclosure includes a heater moving inside a cooking chamber. Therefore, cooking is possible with the heater moving closer to food.

In the present disclosure, a system may be provided in the cooking appliance allowing the heater to be movable inside the cooking chamber.

In the present disclosure, a detection function of detecting a contact status of the heater to the food or the amount of approaching of the heater to the food may be provided.

In the present disclosure, a detection function of controlling the heater so that the moving heater is recovered to the original position thereof or whether or not the moving heater is recovered to a regular position thereof may be provided.

In addition, according to the present disclosure, the cooking appliance may include a casing in which the cooking chamber is provided, a door rotatably provided at one portion of the casing and opening and closing the cooking chamber, a movable heater system including the heater emitting heat and allowing the heater to be movable inside the cooking chamber, a contact detection means detecting whether or not the heater is brought into contact with food inside the cooking chamber or is spaced a predetermined distance, and an original position detection means detecting whether or not the heater is recovered to the original position thereof.

Furthermore, according to the present disclosure, the cooking appliance may include the casing in which the cooking chamber is provided, the door opening and closing the cooking chamber, and the movable heater system provided at one portion of the casing and allowing the heater to be movable inside the cooking chamber.

According to the present disclosure, the cooking appliance may include the casing in which the cooking chamber is provided, the door opening and closing the cooking chamber, a moving assembly provided to be vertically movable inside the cooking chamber and including the heater, and the contact detection means detecting whether or not the moving assembly is brought into contact with an object inside the cooking chamber when the moving assembly is lowered.

According to the present disclosure, the cooking appliance may include the casing in which the cooking chamber is provided, the door opening and closing the cooking chamber, the heater emitting heat, the movable heater system allowing the heater to be movable inside the cooking chamber, and the original position detection means detecting whether or not the heater is located at the original position.

The movable heater system may include: the moving assembly to which the heater is mounted and protected and a fixed assembly provided one portion of the casing and controlling vertical movement of the moving assembly; and a link assembly provided at one portion of the moving assembly, and movably connecting the moving assembly to the fixed assembly.

The fixed assembly may include a moving control means restraining the moving assembly to move vertically by control of the link assembly.

The moving control means may include a motor generating rotation power, a lead screw provided at one portion of the motor and rotated in conjunction with rotation generated by the motor, and a lead nut fastened to the lead screw by screwing.

A connection coupling may be provided between the motor and the lead screw, and the connection coupling may connect a first end of the lead screw to a motor shaft.

The motor may be provided at a fixed bracket securely mounted to the fixed assembly, and the lead nut may be mounted to a moving bracket movably provided to the fixed assembly.

The fixed assembly may include a sliding rail slidingly supporting the moving bracket.

The fixed assembly may include: an upper plate providing an upper surface of the cooking chamber; a protection cover provided at the upper plate and shielding electromagnetic waves through a gap between the moving assembly and the fixed assembly; and a fixed frame provided above the upper plate and supporting the moving control means.

The fixed frame may be provided above the upper plate to be spaced apart therefrom by a fixed guide.

A gap of a predetermined size may be provided between the fixed frame and the protection cover.

The sliding rail may be securely provided on the upper surface of the fixed frame, and the sliding rail may include a sliding member slidingly provided and supporting the moving bracket.

A plurality of guide members may be provided at the protection cover, and the plurality of guide members may guide vertical movement of the moving assembly.

The moving assembly may include a heater housing covering and protecting the heater and an insulating member provided one end of the heater housing and shielding heat or electromagnetic waves.

The heater housing may have a rectangular box shape, and at least one heater hole through which heat of the heater may pass may be formed on a bottom surface thereof by being vertically perforated.

The heater housing may pass through the gap between the fixed frame and the protection cover and move vertically.

The link assembly may have a structure including at least one link, and an upper end thereof may be rotatably connected to the fixed assembly, and a lower end thereof may be rotatably connected to the moving assembly.

The link assembly may include a pair of front links and a pair of rear links, and the pair of front links may be provided to be spaced apart from the pair of rear links at a predetermined distance forward and rearward.

A link frame may be provided below lower ends of the front links and the rear links, the link frame being coupled to the moving assembly.

At least one of left and right lower ends of each of the front links and the rear links may be movable while being coupled to the link frame.

The original position detection means and the contact detection means may be provided at one portion of the fixed assembly, and the original position detection means may detect the original position of the moving assembly and the contact detection means may detect whether or not a lower end of the moving assembly is brought into contact with the food inside the cooking chamber.

The cooking appliance according to the present disclosure has the following effects.

First, the cooking appliance according to the present disclosure is configured to allow the heater to move vertically inside the cooking chamber. Therefore, food is cooked with the heater moving closer to the food in the cooking chamber, so that it is possible to minimize heat loss and reduce a cooking time of food.

Second, in the present disclosure, the flexible connection coupling is provided between the motor and the lead screw. Therefore, it is possible to reduce power loss due to a concentricity error between the motor shaft and the lead screw and to facilitate transmission of rotation power.

Third, in the present disclosure, the guide members are provided to guide the vertical movement of the moving assembly. In other words, the plurality of roller-type guide members is provided to control the vertical movement of the moving assembly. Therefore, when the moving assembly with the heater moves vertically, it is possible to prevent interference of the heater housing, the protection cover, and the fixed frame and prevent damage to parts thereof and occurrence of noise.

Fourth, in the present disclosure, the insulating member is provided in the moving assembly and shields the gap between the moving assembly and the casing of the cooking appliance. Therefore, it is possible to prevent the leakage of electromagnetic waves through the gap between the moving assembly and the casing.

Fifth, in the present disclosure, the edge of the insulating member provided in the moving assembly is overlapped with the upper plate providing the upper surface of the cooking chamber. Therefore, when the moving assembly is raised and located at the original position thereof in the cooking chamber, it is possible to prevent the leakage of electromagnetic waves in the cooking chamber to the outside space.

Sixth, in the present disclosure, the protection switch is provided to detect whether or not the moving assembly interferes with the food when the moving assembly is lowered. Therefore, when the food and the moving assembly are brought into contact with each other, lowering of the moving assembly stops, so that it is possible to prevent damage to the food and the parts thereof.

DETAILED DESCRIPTION OF THE INVENTION

Hereinafter, a cooking appliance according to the present disclosure will be described in detail with reference to accompanying drawings. The cooking appliance according to the present disclosure may be food cookers of various shapes such as a microwave, an electric oven, etc.

Figure 1:
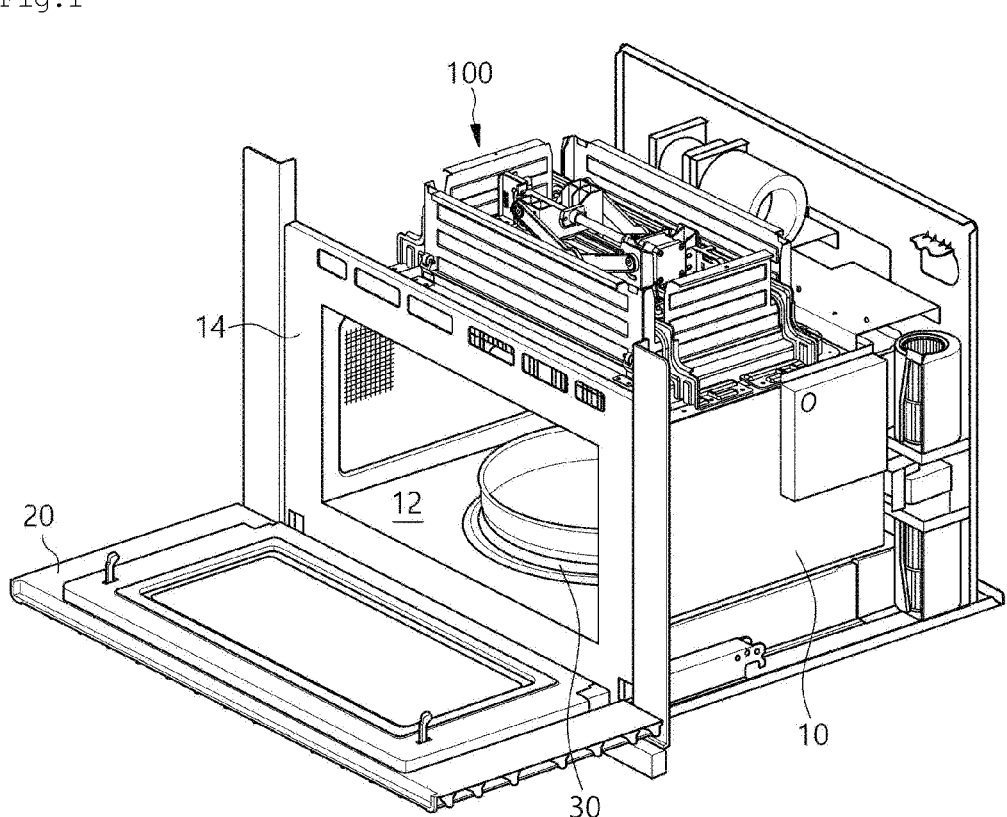
FIG. 1 is a perspective view showing an inner structure of a cooking appliance according to an exemplary embodiment of the present disclosure, wherein the inner structure is shown without an outer cover.

FIG. 1 is a perspective view showing the cooking appliance according to an embodiment of the present disclosure. In other words, in FIG. 1, to describe the cooking appliance according to the present disclosure, a main structure inside the cooking appliance with removing an outer cover will be shown as the perspective view.

As shown in the drawing, the cooking appliance according to the present disclosure includes a casing 10 in which a cooking chamber 12 is provided, and a door 20 provided at one portion of the casing 10 and opening and closing the cooking chamber 12.

The casing 10 serves as a main body of the cooking appliance, and may be shaped in a rectangular box as shown in the drawing, and be preferably open at a front portion thereof so as to put in and take out food.

As described above, when the front portion of the casing 10 is open, the door 20 is provided for shielding the cooking chamber when cooking food, and the door 20 may be rotatably provided on a hinge so as to be able to open and close.

In the present disclosure, as shown in the drawing, the case in which the door 20 is rotatably provided on the hinge at a lower end is illustrated.

A front frame 14 is provided at a front surface of the casing 10 and provides the exterior shape of the front portion of the casing 10, and various display parts (not shown) or deco panels may be provided thereto.

A support plate 30 may be provided in the cooking chamber 12 to support food or a container, and the support plate 30 may be rotatably provided.

A movable heater system 100 may be provided above the casing 10 as shown in the drawing. The movable heater system 100 is a system allowing a heater to move vertically in the cooking chamber 12.

The heater may be provided above the casing 10 and emit heat, and at least two heaters may be provided. In other words, the movable heater system 100 may include the heater and the heater may move vertically in the cooking chamber 12, and the heater may be additionally provided in the casing 10 in addition to the movable heater system 100.

In addition, the cooking appliance according to the present disclosure may include a function of detecting whether or not the heater of the movable heater system 100 is brought into contact with food in the cooking chamber 12 or is spaced apart from the food at a predetermined distance and a function of detecting recovery of the heater of the movable heater system 100 to the original location thereof.

The movable heater system 100 as described above and various functions thereof will be described below.

Figure 2:
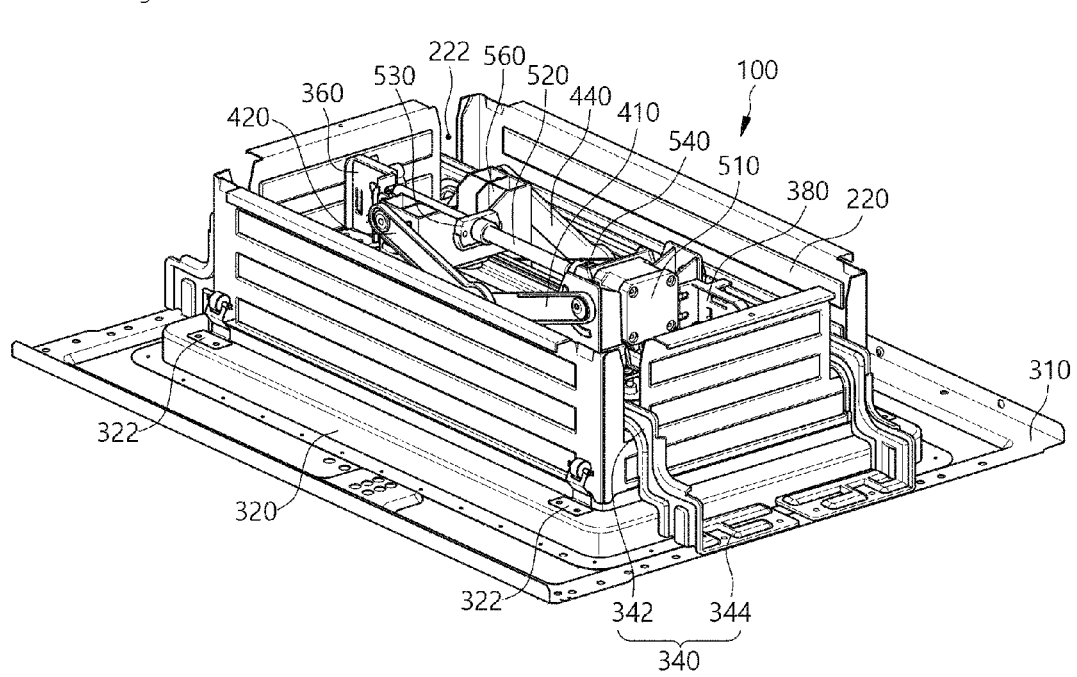
FIG. 2 is a perspective view showing a structure of a movable heater system constituting the embodiment of the present disclosure.
Figure 3:
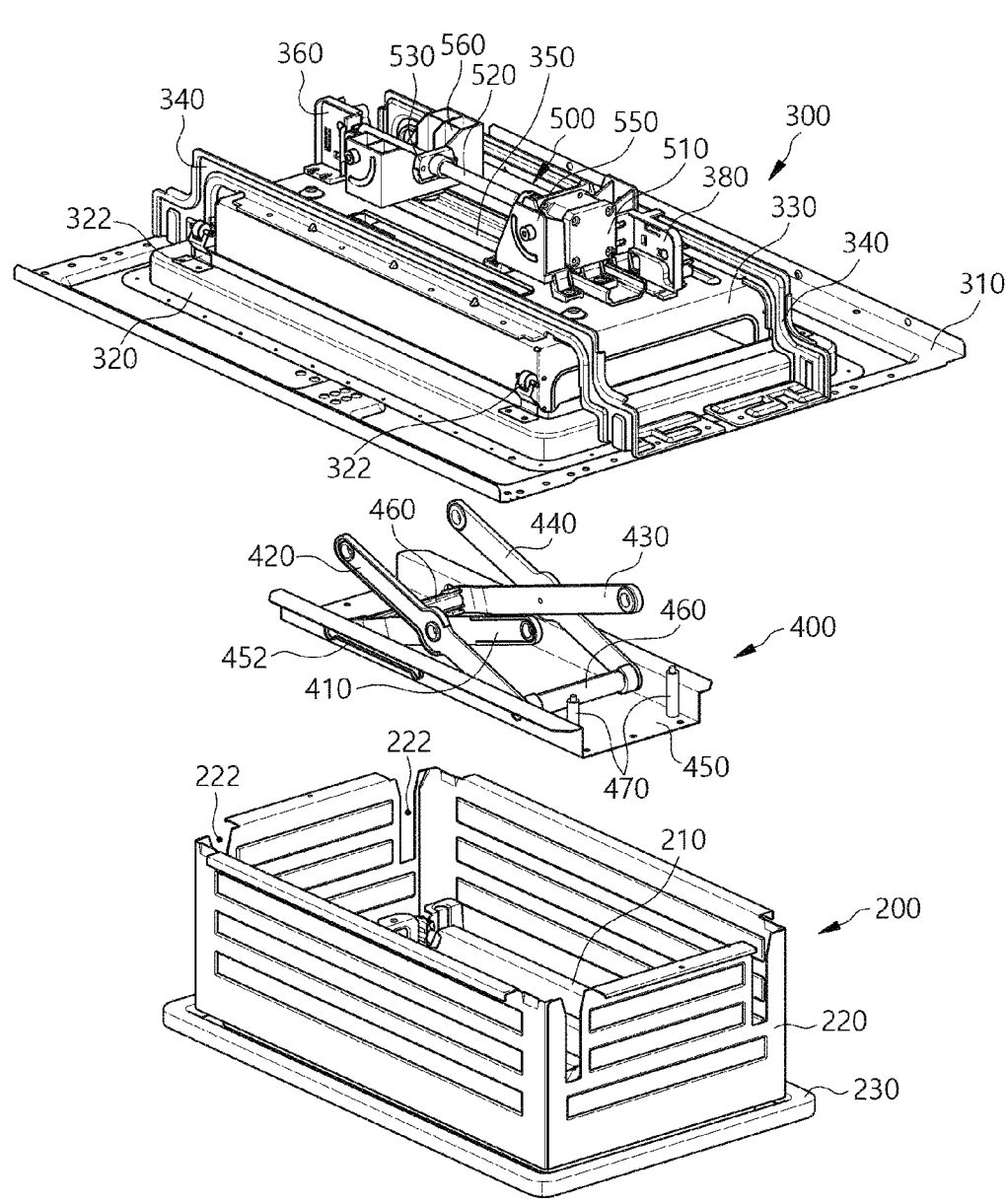
FIG. 3 is an exploded-perspective view showing the movable heater system constituting the embodiment of the present disclosure.
Figure 4:
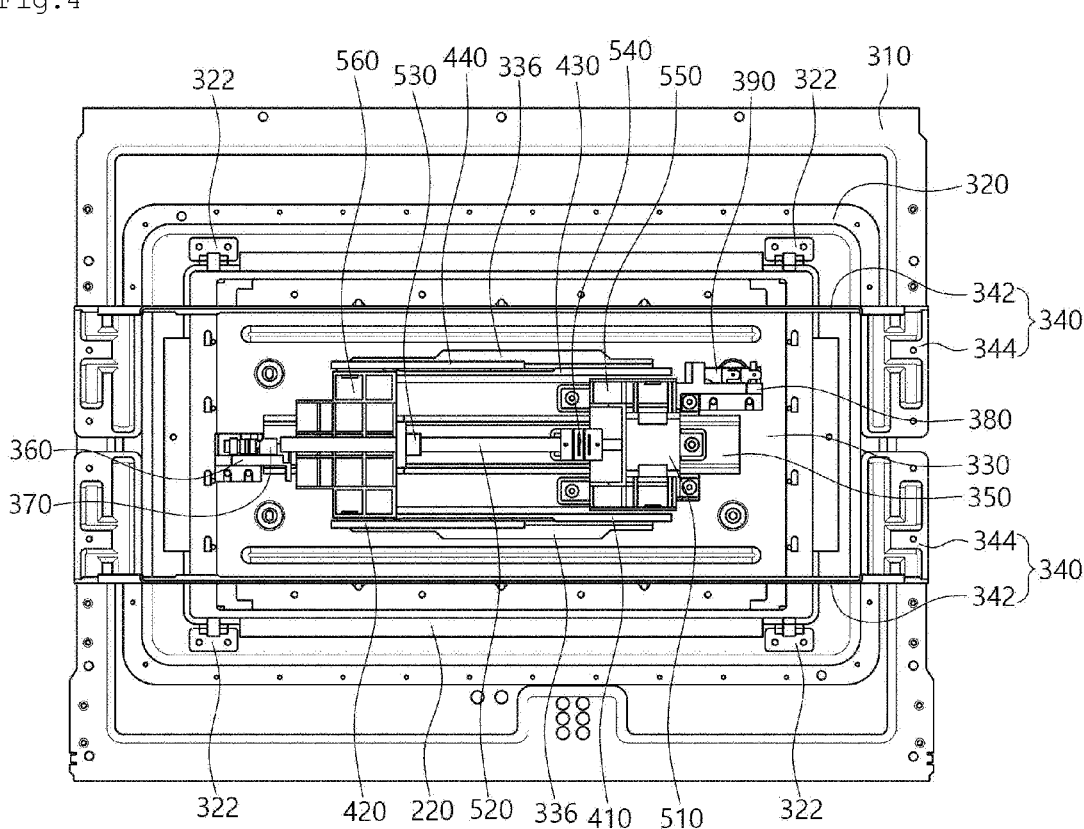
FIG. 4 is a plane view showing the movable heater system shown in FIG. 2.
Figures 5, 6:
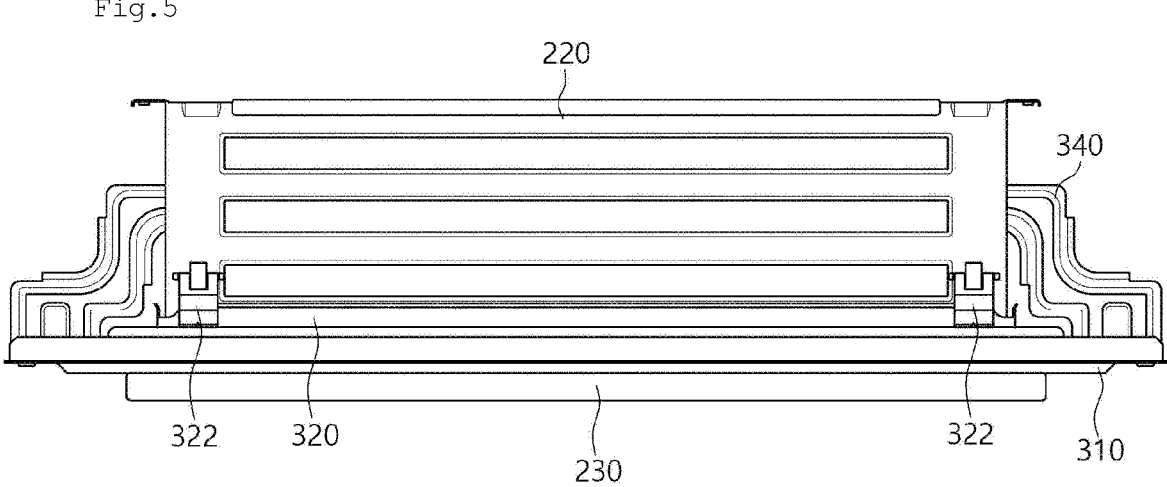
FIG. 5 is a front view showing the movable heater system shown in FIG. 2.
FIG. 6 is a side view showing the movable heater system shown in FIG. 2.
Figure 7:
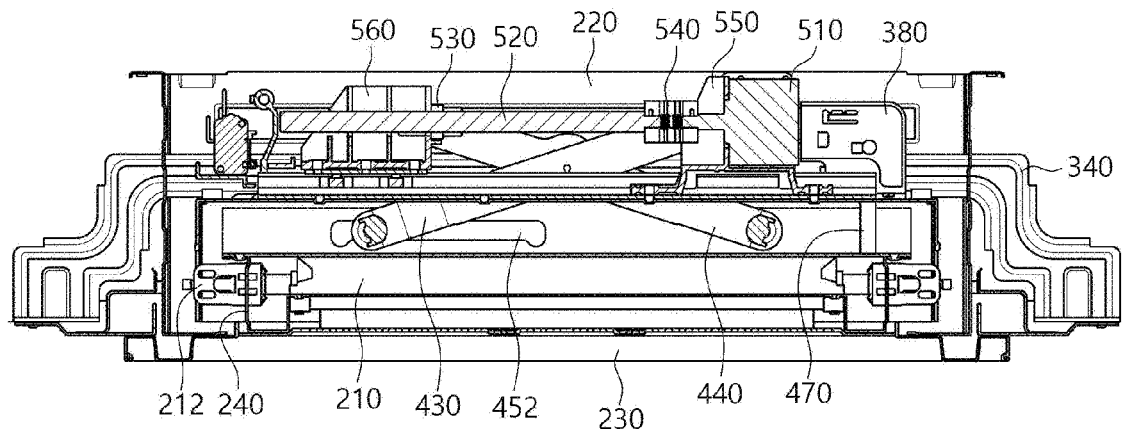
FIG. 7 is a front sectional view showing the movable heater system shown in FIG. 2.
Figure 8:
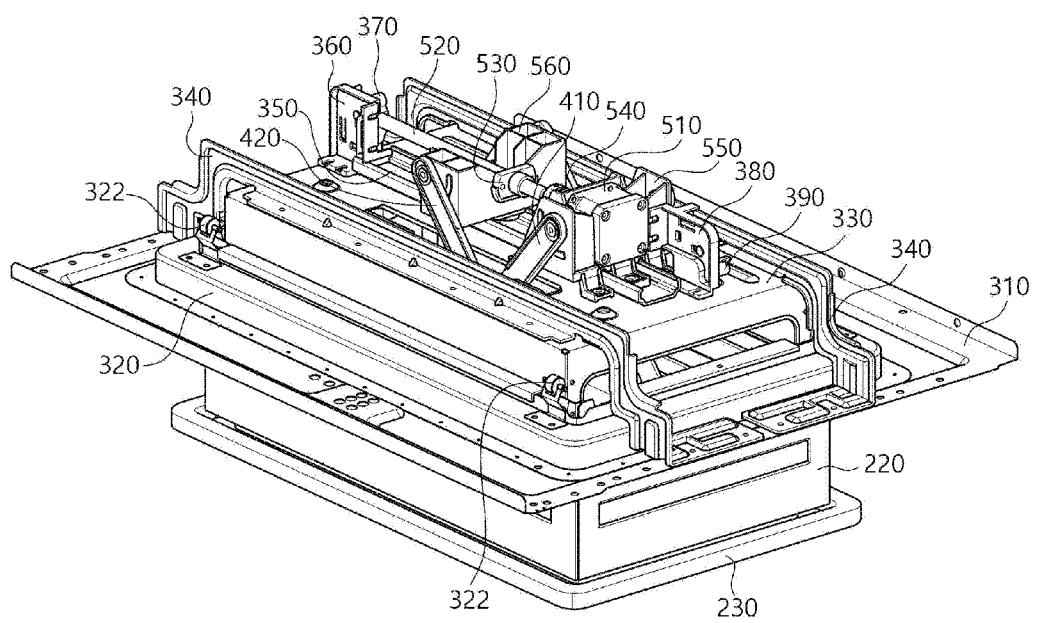
FIG. 8 is a perspective view showing the movable heater system shown in FIG. 2 with a heater lowered.
Figure 9:
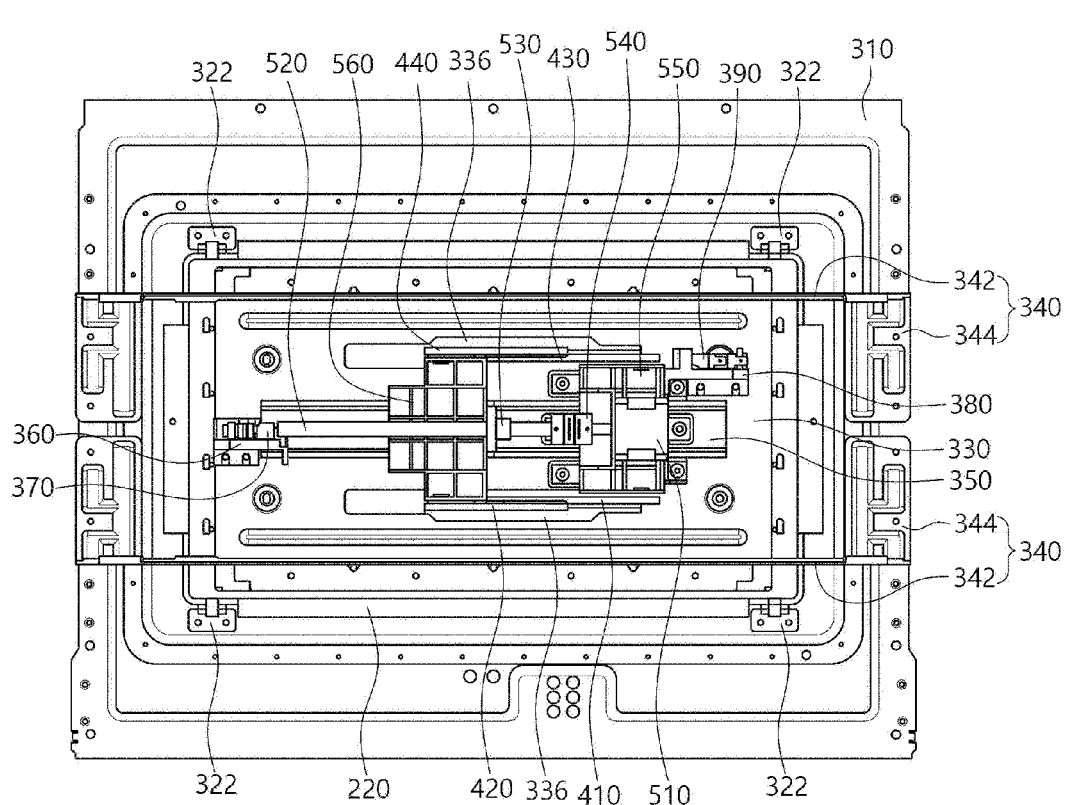
FIG. 9 is a plane view showing the movable heater system shown in FIG. 8.
Figure 10:
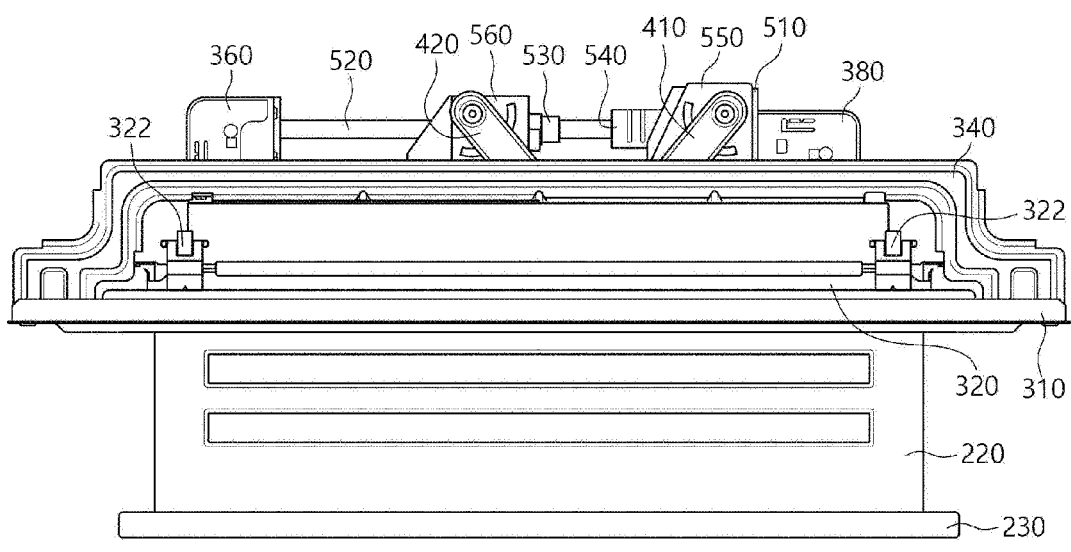
FIG. 10 is a front view showing the movable heater system shown in FIG. 8.
Figure 11:
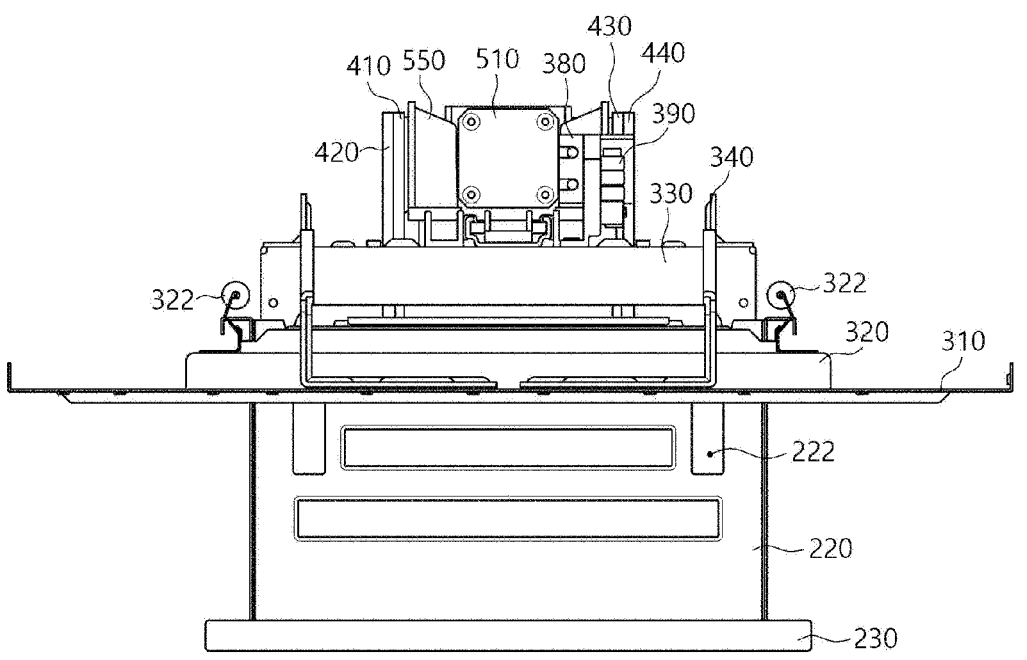
FIG. 11 is a side view showing the movable heater system shown in FIG. 8.
Figure 12:
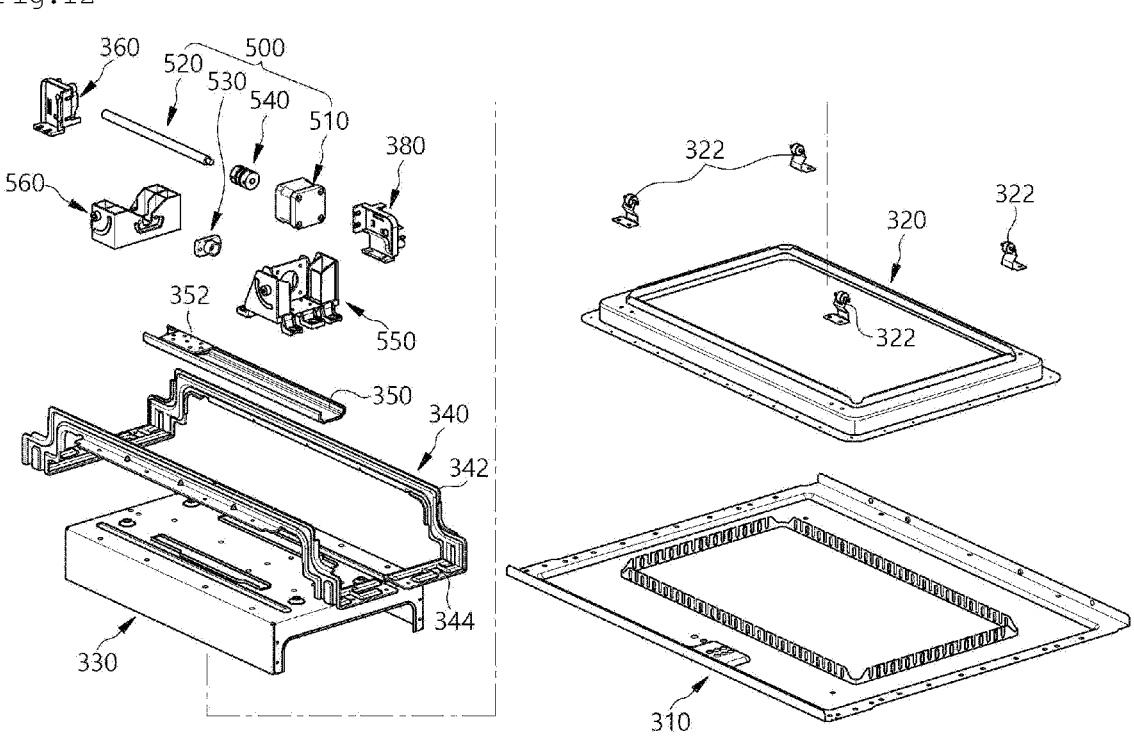
FIG. 12 is an exploded-perspective view showing a structure of a fixed assembly constituting the movable heater system of the cooking appliance according to the present disclosure.
Figure 13:
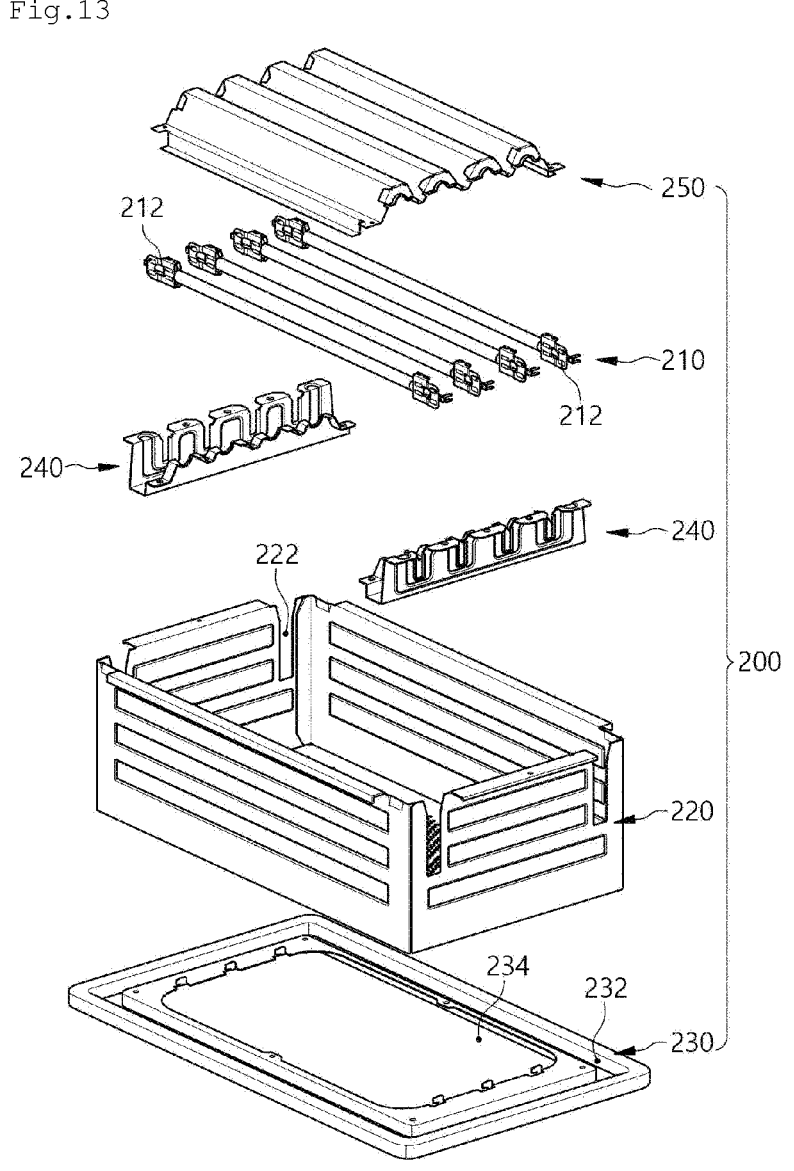
FIG. 13 is an exploded-perspective view showing a structure of a moving assembly constituting the movable heater system of the cooking appliance according to the present disclosure.
Figure 14:
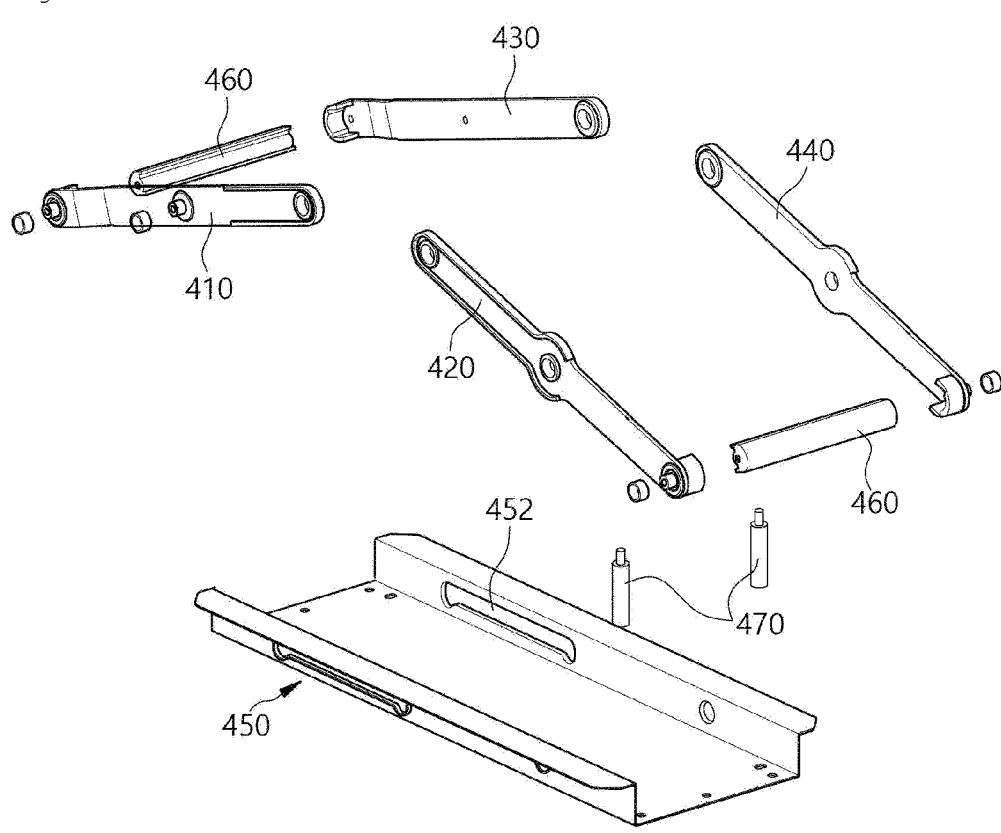
FIG. 14 is an exploded-perspective view showing a structure of a link assembly of the movable heater system of the cooking appliance according to the present disclosure.

FIGS. 2 to 14 are views showing the structure of the movable heater system 100. In other words, FIGS. 2 and 3 are a perspective view and an exploded-perspective view showing the structure of the movable heater system 100. FIGS. 4 to 7 are a plane view, a front view, a side view, and a front sectional view of the movable heater system 100. Furthermore, FIG. 8 is a perspective view showing the structure of the movable heater system 100 with the inner heater lowered. FIGS. 9 to 11 are a plane view, a front view, and a side view showing the movable heater system 100 shown in FIG. 8. FIGS. 12 to 14 are exploded-perspective views showing a fixed assembly, a moving assembly, and a link assembly that constitute the movable heater system 100.

As shown in the drawings, the movable heater system 100 includes a heater 210 emitting heat, and the heater 210 may be provided to be vertically movable in the cooking chamber 12.

Furthermore, the casing 10 or the movable heater system 100 may have a function of detecting whether or not the heater 210 is brought into contact with food inside the cooking chamber 12 or is spaced apart from the food at a predetermined distance and a function of detecting recovery of the heater 210 to the original position of the heater.

The movable heater system 100 may include a moving assembly 200 to which the heater 210 is mounted and protected, a fixed assembly 300 provided at one portion of the casing 10 and controlling a vertical movement of the moving assembly 200, and a link assembly 400 provided at one portion of the moving assembly 200 and movably connecting the moving assembly 200 to the fixed assembly 300.

The moving assembly 200 is separably provided from the casing 10 to be movable inside the cooking chamber 12, and surrounds at least side portion of the heater 210 so that it is preferable that heat of the heater 210 is concentrated downward and is prevented from emitting sideways.

The fixed assembly 300 may be securely provided on the casing 10 and supports the moving assembly 200 so that the moving assembly 200 moves in a vertical direction while being supported by an upper surface of the casing 10.

Therefore, the fixed assembly 300 includes a moving control means 500, and the moving control means 500 restrains the moving assembly 200 so that the moving assembly 200 vertically moves by control of the link assembly 400.

The link assembly 400 may be provided above, etc. the moving assembly 200, and includes at least one link, thereby guiding the moving assembly 200 so that the moving assembly 200 moves vertically while being connected to the fixed assembly 300.

Upper and lower ends of the link assembly 400 may be rotatably connected to the fixed assembly 300 and the moving assembly 200, respectively.

The fixed assembly 300 may include an upper plate 310 providing an upper surface of the cooking chamber 12, a protection cover 320 provided at the upper plate 310 and blocking electromagnetic waves via a gap between the moving assembly 200 and the fixed assembly 300, and a fixed frame 330 provided above the upper plate 310 and supporting the moving control means 500.

The upper plate 310 may be shaped in a rectangular plate having a predetermined thickness and provide the upper surface of the cooking chamber 12. In addition, a center portion of the upper plate 310 may be vertically perforated and provide a path through which the moving assembly 200 moves vertically.

The fixed frame 330 may be provided to be spaced apart from the protection cover 320.

More specifically, the protection cover 320 may also have a rectangular shape like the upper plate 310, and a hole vertically perforated may be formed in a center portion of the protection cover 320 like the upper plate 310 and may have a rectangular frame shape. Therefore, the moving assembly 200 may move vertically via the center holes of the upper plate 310 and the protection cover 320.

Then, the fixed frame 330 may have a rectangular shape smaller than the hole formed in the center portion of the protection cover 320. Therefore, a predetermined gap is formed between the fixed frame 330 and the protection cover 320, and it is preferable that a heater housing 220 of the moving assembly 200 is accommodated in the gap and moves vertically.

The fixed frame 330 may be securely provided above the upper plate 310, and therefore, a fixed guide 340 may be provided between the upper plate 310 and the fixed frame 330.

As shown in the drawing, the fixed guide 340 may have a shape of '∩' (when which is seen from the front side). Therefore, an upper end of the fixed guide 340 may be coupled to the fixed frame 330, and a lower end thereof may be fixed to the upper plate 310 or the protection cover 320.

Specifically, the fixed guide 340 may include a frame coupling part 342 coupled to the fixed frame 330, and an upper coupling part 344 fixed to the upper plate 310 or the protection cover 320. In the present disclosure, the case in which the upper coupling part 344, i.e., the lower end of the fixed guide 340 is fastened to the upper surface of the upper plate 310 is illustrated.

A plurality of fixed guides 340 may be provided and, in the present disclosure, the case in which two fixed guides 340 are provided at an upper portion of the upper plate 310 to be spaced apart from each other forward and rearward at a predetermined gap and supports the fixed frame 330 is illustrated.

The fixed assembly 300 may include a sliding rail 350 slidingly supporting a moving bracket 560, a lead nut 530, or the like, and the moving bracket 560 and the lead nut 530 will be described below.

Specifically, the sliding rail 350 is provided at an upper surface of the fixed frame 330 to have a predetermined transversal length, and the moving bracket 560 or the lead nut 530, which will be described below, may be provided on the sliding rail 350 to be movable left and right.

The moving control means 500 may be provided above the fixed frame 330.

The moving control means 500 may include a motor 510 generating rotating power, a lead screw 520 provided at one portion of the motor 510 and rotated in conjunction with rotation generated by the motor 510, and the lead nut 530 fastened to the lead screw 520 by screwing.

The motor 510 may generate rotation power, and a stepping motor may be used as the motor 510 so as to perform precise rotation control. The stepping motor may perform the supply of forward and reverse rotation movements in response to a rotation angle by pulse control.

As shown in the drawings, the lead screw 520 may be a fine cylinder of a predetermined length, of which an outer surface is formed in a male screw and, herein, the lead screw 520 may be fastened with the lead nut 530 having a female screw corresponding to the male screw of the lead screw 520. Therefore, when the lead screw 520 is rotated by the power of the motor 510, the lead nut 530 moves left and right along the lead screw 520. As described above, the lead screw 520 and the lead nut 530 serves to change the forward/reverse rotation movements into a linear movement.

A connection coupling 540 may be provided between the motor 510 and the lead screw 520, and the connection coupling 430 may connect one end of the lead screw 520 to the motor shaft. As shown in the drawings, the connection coupling 540 may be provided at a right end of the lead screw 520 and the motor shaft protruding leftward from the motor 510.

The connection coupling 540 is used to reduce power loss due to a concentricity error between the shaft of the motor 510 and the shaft of the lead screw 520 and to make rotation smooth, and it is preferable that a flexible coupling is used as the connection coupling. In other words, as the connection coupling 540, a MST-type or MSTS-type flexible coupling may be used.

The motor 510 may be provided at a fixed bracket 550 securely mounted to the fixed assembly 300, and the lead nut 530 may be mounted to the moving bracket 560 movably installed to the fixed assembly 300.

Specifically, the fixed frame 330 may be provided above the upper plate 310 to be spaced apart therefrom by the fixed guides 340. A predetermined gap may be provided between the fixed frame 330 and the protection cover 320, thereby providing a moving path of the heater housing 220.

Furthermore, both of the fixed bracket 550 and the moving bracket 560 are provided above the fixed frame 330 of the fixed assembly 300. As shown in the drawings, the fixed bracket 550 is securely mounted to the upper surface of the fixed frame 330, and the moving bracket 560 is movably provided to move closer to or away from the fixed bracket 550 above the fixed frame 330.

As described above, the sliding rail 350 is securely installed to the fixed frame 330, and a sliding member 352 may be slidingly provided at the sliding rail 350 and support the moving bracket 560.

As shown in the drawings, the sliding member 352 having a rectangular plate shape may be provided at an upper portion of the sliding rail 350 to be slidable left and right, and the moving bracket 560 may be fixed on an upper surface of the sliding member 352 and be movable left and right.

The motor 510 may be mounted to the fixed bracket 550 and the lead nut 530 may be mounted to the moving bracket 560. Therefore, when the lead screw 520 is rotated in response to rotation of the motor 510 mounted to the fixed bracket 550, the lead nut 530 moves left and right, and eventually, the moving bracket 560 moves left and right along the sliding rail 350.

Link upper ends of the link assembly 400 may be rotatably installed to the fixed bracket 550 and the moving bracket 560. In other words, when the left and right upper ends of the 'X'-shaped link provided in the link assembly 400 are respectively connected to the fixed bracket 550 and the moving bracket 560, left and right movement of the moving bracket 560 allows the left and right upper ends of the 'X'-shaped link to move closer to or away from each other, so that the moving assembly 200 fixed to a lower end of the link assembly 400 moves up and down.

A protection bracket 360 and a position bracket 380 may be provided on the fixed frame 330 of the fixed assembly 300.

As shown in the drawings, the protection bracket 360 may be provided on an upper surface of a left end of the fixed frame 330, and a protection switch 370 may be installed thereto, and the protection switch 370 has the detection function for protecting the parts from interference of the heater 210 and food.

As shown in the drawings, the position bracket 380 may be provided at an upper surface of a right end of the fixed frame 330, and a the position switch 390, etc. may be installed thereto, and the position switch 390 allows the moving assembly 200 to be recovered to the original location thereof or detects that the moving assembly 200 is located at the original location.

The protection cover 320 may include a plurality of guide members 322 guiding vertical movement of the moving assembly 200. As shown in the drawings, four guide members 322 may be respectively provided at four corners of the protection cover 320 of the rectangular frame shape, and the guide members 322 serve to support the heater housing 220 to prevent the heater housing 220 from interfering with the protection cover 320 when the heater housing 220 to be described below passes through the gap between the fixed frame 330 and the protection cover 320.

The moving assembly 200 may include the heater housing 220 and an insulating member 230, the heater housing 220 covering and protecting the heater 210 and the insulating member 230 being provided at one end of the heater housing 220 and blocking heat or electromagnetic waves.

The heater housing 220 may have a rectangular box shape as shown in the drawings, and a bottom surface thereof may have at least one hole, which is formed by being vertically perforated, so as to allow the passage of heat of the heater 210.

The heater housing 220 may move up and down by passing through the gap between the fixed frame 330 and the protection cover 320. Therefore, the heater housing 220 may have the rectangular box shape with an open upper portion, and have a predetermined thickness. Thicknesses of the four lateral surfaces of the heater housing 220 may be preferably formed smaller than the size of the gap between the fixed frame 330 and the protection cover 320.

The heater housing 220 may have guide grooves 222 selectively storing the fixed guide 340. In other words, as shown in the drawings, the guide grooves 222 may be formed in the left and right lateral surfaces of the heater housing 220 by being depressed downward from upper ends of the surfaces at a predetermined length. The frame coupling part 342 of the fixed guide 340 is stored in the guide grooves 222 when the moving assembly 200 is raised.

The insulating member 230 may be preferably formed to have a rectangular frame shape as shown in the drawings, and lateral ends thereof may be preferably formed to protrude outward than lateral ends of the heater housing 220. The exterior size of the insulating member 230 may be formed larger than the lateral size of the heater housing 220, so that the insulating member 230 may serve to shield electromagnetic waves from leaking through the gap between the fixed frame 330 and the protection cover 320 when the moving assembly 200 is raised.

A seating groove 232 may be formed on an upper surface of the insulating member 230 by being depressed downward and on which a lower end of the heater housing 220 is seated.

The heater 210 is stored and fixed inside the heater housing 220.

The heater 210 may have a left-right or front-rear long shape and a plurality of heaters may be preferably provided in an inner lower end of the heater housing 220.

Heater brackets 212 may be provided at opposite ends of each heater 210 and guide mounting of each heater 210 or power supply of each heater 210.

A pair of support ends 240 having a symmetrical shape may be provided at left and right portions of a lower inner end of the heater housing 220, and the support ends 240 may support the plurality of heaters 210.

Meanwhile, the support ends 240 may support the lower end of the link assembly 400. In other words, upper ends of the support ends 240 may be coupled to the lower end of the link assembly 400. Therefore, the moving assembly 200 may move up and down while being fixed to the lower end of the link assembly 400.

A heater cover 250 may be provided above the heaters 210 to cover upper portions of the heaters 210, and the heater cover 250 may have the shape corresponding to the number or the shape of the heaters 210.

The link assembly 400 may have a structure including at least one link, and preferably, the upper end thereof may be rotatably connected to the fixed assembly 300 and the lower end thereof may be rotatably connected to the moving assembly 200.

The link assembly 400 may include a pair of front links in 410 and 420 and a pair of the rear links 430 and 440 that are spaced apart from each other forward and rearward at a predetermined distance, and a link frame 450 may be provided at lower ends of the front links 410 and 420 and the rear links 430 and 440, the link frame 340 being coupled to the moving assembly 200.

In addition, at least one of left and right ends of each of the front links 410 and 420 and the rear links 430 and 440 may be preferably installed to movable while being coupled to the link frame 450.

Specifically, the pair of front links 410 and 420 may be configured such that a front first link 410 and a front second link 420 formed in a 'X'-shape may be coupled to cross each other to be rotatable on the center, and the pair of rear links 430 and 440 may be configured such that a rear first link 430 and a rear second link 440 formed in a 'X'-shape may be coupled to cross each other to be rotatable on the center.

The lower ends of the front first link 410 and the rear first link 430, which are installed to be spaced apart from each other forward and rearward by the predetermined distance, may be connected to each other by a connection link 460, and the lower ends of the front second link 420 and the rear second link 440 may be connected to each other by the connection link 460.

At least one of the left and right lower ends of the front links 410 and 420 and at least one of the left and right lower ends of the rear links 430 and 440 may be movably installed while being coupled to the link frame 450. According to the present disclosure, as shown in the drawings, the case in which the lower ends of the front first link 410 and the rear first link 430 may be installed to be movable left and right of the link frame 450 is illustrated.

Therefore, first link protrusion holes 452 may be preferably formed at a left half portion of the link frame 450, and the first link protrusion hole 452 may accommodate lower end shafts of the front first link 410 and the rear first link 430 and guide transverse movement thereof.

The link frame 450 may include a position member 470, etc., and the position member 470 may detect the recovery of the moving assembly 200 to the original position thereof. The position member 470 may be formed to protrude upward from an upper surface of the link frame 450 by a predetermined height, and an upper end of the position member 470 may selectively interfere with the position switch 390.

An original position detection means and a contact detection means may be provided at one portion of the fixed assembly 300, and the original position detection means detects the original position of the moving assembly 200 and the contact detection means detects whether or not a lower end of the moving assembly 200 touches the food inside the cooking chamber 12.

The original position detection means detects whether or not upward movement of the moving assembly 200 in the cooking chamber 12 is completed, and may include the position switch 390, etc.

The contact detection means detects whether or not the lower end of the moving assembly 200 with the heaters 210 touches the food, and may include the protection switch 370, etc.

FIGS. 15 to 24 are views showing an example of each part constituting the movable heater system 100 in detail.

Figure 15:
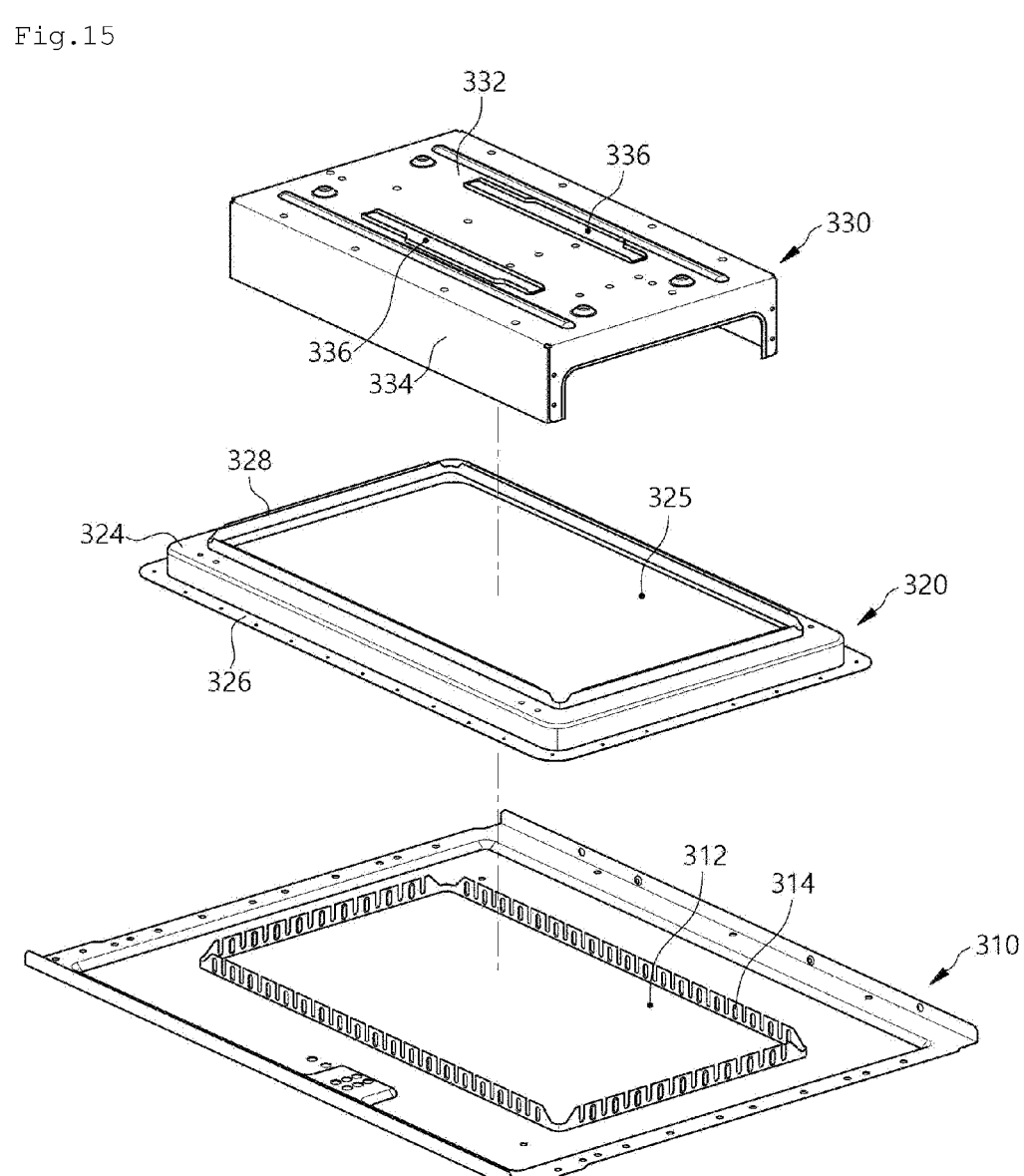
FIG. 15 is an exploded-perspective view showing a structure of an upper plate, a protection cover, and a fixed frame constituting the embodiment of the present disclosure.

First, FIG. 15 is an exploded-perspective view showing the upper plate 310, the protection cover 320, and the fixed frame 330 that constitute the fixed assembly 300.

As shown in the drawing, the upper plate 310 may have a rectangular plate shape, and an upper hole 312 of a rectangular hole with a predetermined size may be formed by being vertically perforated therein. The upper hole 312 serves as a path through which the moving assembly 200 reciprocates up and down. Therefore, the inner size of the upper hole 312 may be preferably formed larger than the outer size of the heater housing 220.

The upper plate 310 may include a plurality of choke pieces 314. In other words, as shown in the drawing, the plurality of choke pieces 314 may extend upward on an inner circumferential surface of the upper plate 310 having the rectangular frame shape, the plurality of choke pieces being perpendicularly bent upward.

Specifically, the plurality of upward protruding choke pieces 314 may be formed on edges of the upper hole 312 formed at the center portion of the upper plate 310, and the plurality of choke pieces 314 serves to block leakage of electromagnetic waves inside the cooking chamber 12.

Preferably, the protection cover 320 may have a rectangular frame shape corresponding to the upper plate 310, and the size of an exterior edge may be preferably formed in size smaller than an exterior edge of the upper plate 310.

As shown in the drawing, a protection hole 325 may be formed in the center portion of the protection cover 320 by being vertically perforated, the protection hole 312 corresponding to the upper hole 312, thereby allowing the vertical movement of the heater housing 220.

As shown in the drawing, preferably, the protection cover 320 may be formed to be stepped so that the height of an inner edge is higher than the height of an outer edge.

Specifically, the protection cover 320 may include a protection stepped part 324, a protection lower end part 326, and a protection upper end part 328. The protection stepped part 324 may be formed to have sections of '⌐' and '⌐' shapes (when the protection stepped part is seen from the left and right or the front and rear), the protection lower end part 326 may extend to be perpendicularly bent sideways from a lower end of the protection stepped part 324, and the protection upper end part 328 may extend to be perpendicularly bent to the upper side from an inner edge of the protection stepped part 324.

The choke pieces 314 of the upper plate 310 may be accommodated under the protection stepped part 324.

As shown in the drawing, the fixed frame 330 may be formed to have a section of '∩'-shape (the fixed frame is seen from the side). Therefore, the fixed frame 330 may include a horizontal end 332 of a flat plate shape having a predetermined thickness, and vertical ends 334 extending by being perpendicularly bent downward from front and rear ends of the horizontal end 332.

A pair of link passing holes 336 may be formed in the horizontal end 332 by being vertically perforated. Preferably, the pair of link passing holes 336 may be formed to have predetermined transverse lengths, and here, the link assembly 400 may serve as a passage through which the link passes. In other words, the link passing holes 336 may be installed such that the front links 410 and 420 and the rear links 430 and 440 pass through vertically or allow the front links 410 and 420 and the rear links 430 and 440 to pass therethrough.

Figure 16:
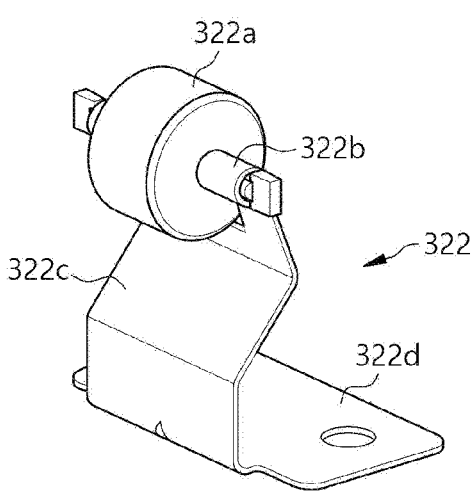
FIG. 16 is a perspective view showing a structure of a guide member constituting the embodiment of the present disclosure.

FIG. 16 is a perspective view showing the structure of the guide members 322.

As shown in the drawing, the guide members 322 may include a roller 322a, a roller shaft 332b, a roller support part 322c, and a roller fixation end 322d. The roller 322a may be selectively brought into contact with the outer surface of the heater housing 220, the roller shaft 332b may be a rotary center of the roller 322a, the roller support part 322c may rotatably support the roller 322a or the roller shaft 332b, and the roller fixation end 322d may extend to be perpendicularly bent from a lower end of the roller support part 322c and tightly fixed to the protection cover 320.

The roller 322a may be shaped in a cylindrical shape or a canister shape, and a material thereof may be an elastic material such as rubber. In addition, the roller 322a may be rotatably connected to the roller shaft 332b, or the roller 322a and the roller shaft 332b may be fixed to each other. When the roller 322a and the roller shaft 332b are fixed to each other or provided to be integrated with each other, the roller shaft 332b should be connected to an upper end of the roller support part 322c.

The roller support part 322c may be shaped in a flat plate having a predetermined thickness as shown in the drawing, or may have a bent shape.

The roller fixation end 322d may be provided by extending from the roller support part 322c, and the roller fixation end 322d may be bent so as to be perpendicular to the roller support part 322c or inclined at a predetermined angle against the roller support part 322c.

The roller fixation end 322d may be preferably securely mounted to an upper surface of the protection stepped part 324 of the protection cover 320. Therefore, an end (inner end) of the roller 322a may protrude partially into the inside space of the protection hole 325 of the protection cover 320, thereby being brought into contact with the outer surface of the heater housing 220 passing through the gap between the protection cover 320 and the fixed frame 330.

Figure 17:
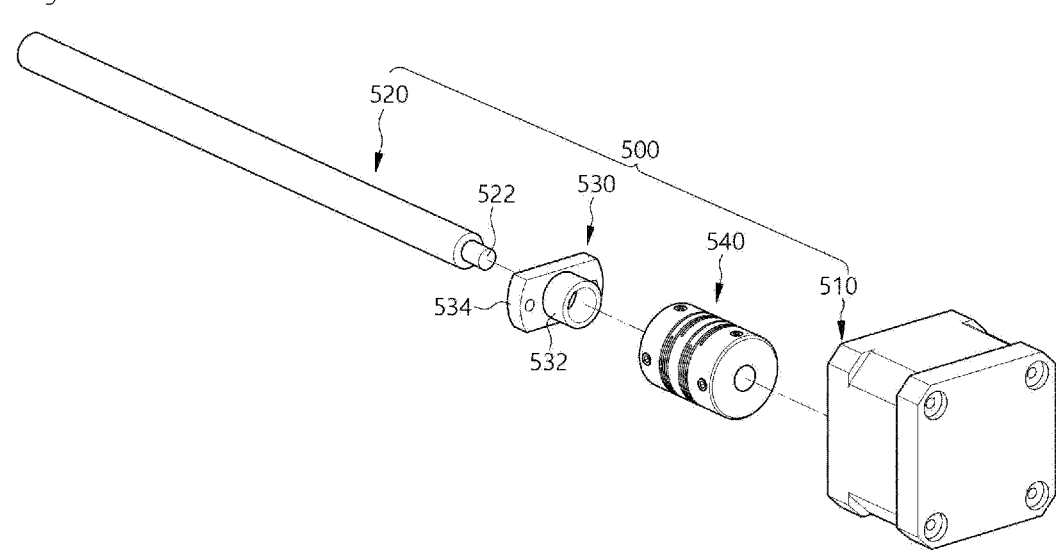
FIG. 17 is an exploded-perspective view showing a structure of a moving control means constituting the embodiment of the present disclosure.

FIG. 17 is an exploded-perspective view showing the moving control means 500.

As shown in the drawing, the lead screw 520 of the moving control means 500 may have the transversally long shape, and a screw thread may be preferably formed in the outer circumferential surface thereof. In addition, an insertion protrusion 522 may protrude rightward from a right end of the lead screw 520, and the insertion protrusion 522 may be fitted into a center groove of the connection coupling 540.

The lead nut 530 may have a nut part 532, a nut fixation part 534, etc., and the nut part 532 may have a canister shape so that the lead screw 520 passes therethrough, and the nut fixation part 534 may extend perpendicularly to the nut part 532 and fix the nut part 532 to the moving bracket 560.

A female screw may be formed on an inner circumferential surface of the nut part 532 of the lead nut 530, the female screw corresponding to the male screw formed on the outer circumferential surface of the lead screw 520 and, preferably, the lead screw 520 and the lead nut 530 may be coupled to each other by screwing.

As described above, the connection coupling 540 may be configured of a flexible coupling, and the connection coupling 540 may have a predetermined transverse elasticity or a predetermined amount of transverse length change thereof (reduction and tension of length) may be performed.

The motor 510 generates the rotation power as described above and supplies the rotation power to the lead screw 520. Preferably, the motor shaft (not shown) of the motor 510 may be inserted into and fixed to the center groove of the right end of the connection coupling 540.

Figure 18:
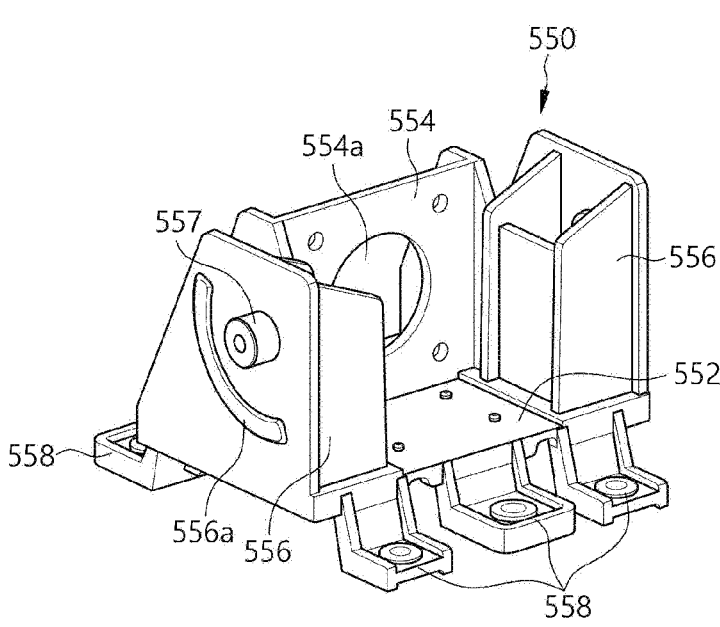
FIG. 18 is a perspective view showing a fixed bracket constituting the embodiment of the present disclosure.

FIG. 18 is a perspective view showing the structure of the fixed bracket 550. As shown in the drawing, the fixed bracket 550 may include a motor seating end 552, a motor fixation end 554, and a link fastening end 556, and the motor seating end 552 may be formed to have a flat surface in an upper surface thereof to support the motor 510, so that the motor 510 may be securely seated thereon, the motor fixation end 554 may extend from the motor seating end 552 to be perpendicular to the upper side and support a lateral surface of the motor 510, and the link fastening end 556 may extend upward from each of front and rear ends of the motor seating end 552 and rotatably support the upper ends of the front links 410 and 420 and the rear links 430 and 440.

Fixing fastening ends 558 may be formed on each of left and right ends of on the motor seating end 552, and the fixing fastening ends 558 may allow the fixed bracket 550 to be securely mounted to the upper surface of the fixed frame 330 by fastening tools such as a bolt, etc. As shown in the drawing, the fixing fastening ends 558 may be formed to have the position lower than the height of the motor seating end 552.

As shown in the drawing, the motor fixation end 554 may be formed into a vertical surface, and a motor hole 554a may be formed in the motor fixation end 554 by being perforated transversally. The motor hole 554a may have a diameter of a predetermined size, and the motor shaft (not shown) of the motor 510 or the connection coupling 540 may be accommodated in the motor hole 554a to passes through transversally.

A pair of link fastening ends 556 may have right upper link shafts 557, and the right upper link shafts 557 may protrude forward and rearward from the pair of link fastening ends 557 to support the upper ends of the front first link 410 and the rear first link 430 so that the upper ends of the front first link 410 and the rear first link 430 may be rotatably connected to the right upper link shafts 557.

In addition, a reinforcement part 556a may be formed on a front or rear surface of the pair of link fastening ends 556 by protruding forward or rearward and may serve to reinforce the rigidity.

Figure 19:
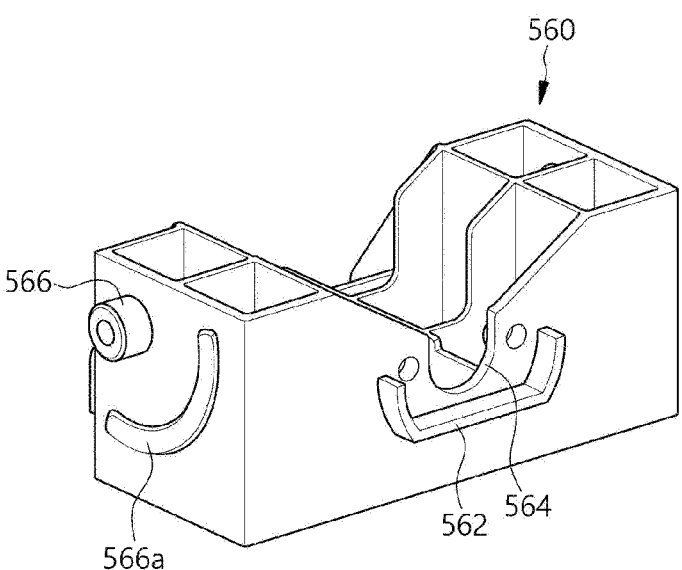
FIG. 19 is a perspective view showing a moving bracket constituting the embodiment of the present disclosure.

FIG. 19 is a perspective view showing a structure of the moving bracket 560. As shown in the drawing, the moving bracket 560 may have a square or rectangular section at a lower surface thereof and, preferably, the moving bracket 560 may be closely fixed to the upper surface of the sliding member 352.

As shown in the drawing, a nut support end 562 may protrude rightward from a right surface of the moving bracket 560. The nut support end 562 may support the lead nut 530 so that the lead nut 530 may be seated and fixed thereon, and as shown in the drawing, the nut support end 562 may have at least a shape corresponding to a shape of a lower end of the lead nut 530 so as to support the lower portion of the lead nut 530.

A screw groove 564 may be formed at the center portion of the moving bracket 560, the screw groove 564 being depressed downward while passing through transversally. Preferably, the screw groove 564 may be formed larger than an outer diameter of the lead screw 520, and the lead screw 520 may be accommodated therein.

Left upper link shafts 566 may protrude forward and rearward on a front surface and a rear surface of the moving bracket 560. The left upper link shafts 566 may be a portion where the link upper end of the link assembly 400 may be rotatably connected thereto together with the right upper link shafts 557. In other words, preferably, the upper ends of the front second link 420 and the rear second link 440 may be rotatably connected to the pair of left upper link shafts 566, respectively.

Furthermore, a reinforcement part 566a may protrude forward and surface and the rear the moving bracket 560 together with the surface of reinforcement part 556a formed on the link fastening end 556.

Figures 20, 21:
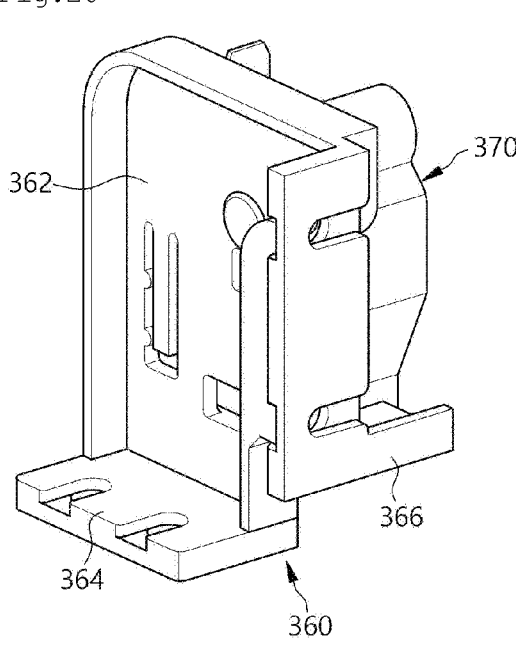
FIG. 20 is a perspective view showing a structure of a protection bracket constituting the embodiment of the present disclosure.
FIG. 21 is a perspective view showing a structure of a position bracket constituting the embodiment of the present disclosure.

FIG. 20 is a front perspective view showing a structure of the protection bracket 360.

As shown in the drawing, the protection bracket 360 may include a protection support part 362 and a protection fixation end 364, and the protection support part 362 may have predetermined vertical size and thickness, and the protection fixation end 364 may be perpendicularly bent from a lower end of the protection support part 362 and closely fixed to the upper surface of the fixed frame 330.

Furthermore, the protection switch 370 may be installed at the protection support part 362 to interfere with the lead screw 520 and detect whether or not the moving assembly 200 is brought into contact with the food. To this end, a protection installation end 366 may be provided at the protection support part 362 to support the protection switch 370.

In the embodiment, as shown in the drawing, the case in which the protection installation end 366 extends rearward from a rear surface of the protection support part 362 to support the protection switch 370 is illustrated.

FIG. 21 is a front perspective view showing a structure of the position bracket 380.

As shown in the drawing, the position bracket 380 may include a position support part 382 and a position fixation end 384, and the position support part 382 may have a predetermined vertical size and thickness, and the position fixation end 384 may be perpendicularly bent from a lower end of the position support part 382 and closely fixed to the upper surface of the fixed frame 330.

Furthermore, the position support part 382 may include the position switch 390, etc., and the position switch may interfere with the position member 470 and detect whether or not the moving assembly 200 is recovered to the original position thereof. To this end, a position installation end 386 may be provided at the position support part 382 to support the position switch 390.

In the embodiment, as shown in the drawing, the case in which the position installation end 386 extends rearward from the rear surface of the protection support part 362 and supports the position switch 390, etc. is illustrated.

Meanwhile, the position bracket 380 may be coupled to the fixed bracket 550 and, to this end, a bracket coupling end 388 may be formed at a left end of the position bracket 380 to be perpendicular to the position support part 382.

Figure 22:
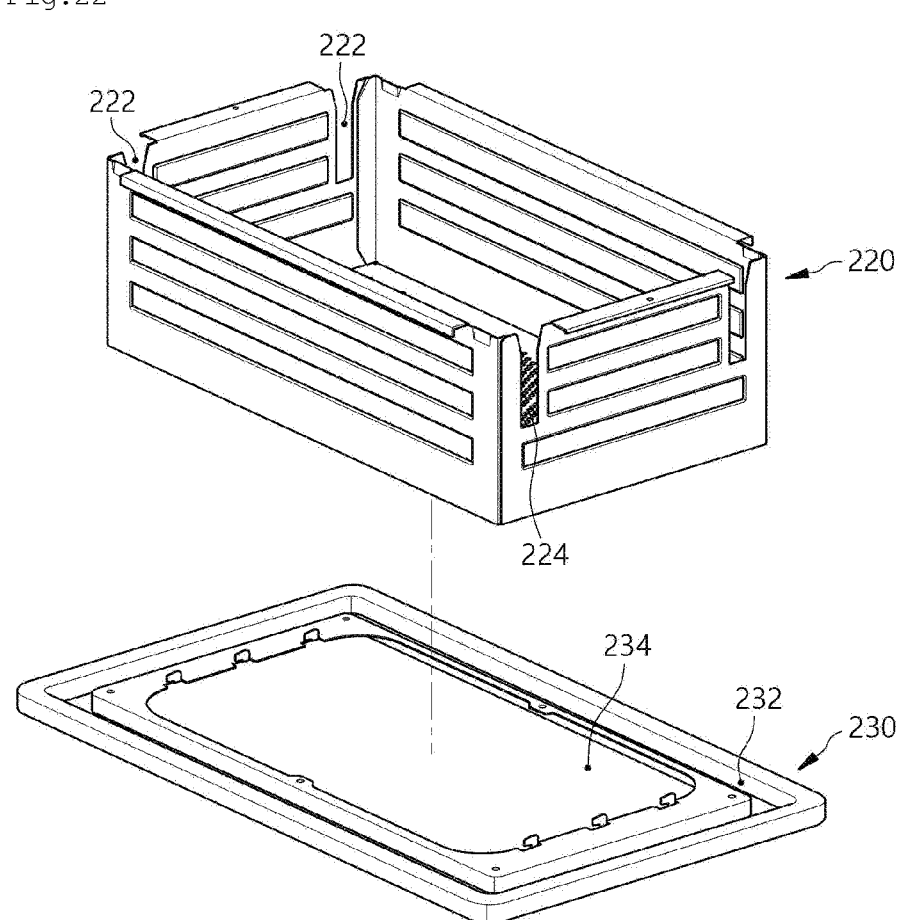
FIG. 22 is an exploded-perspective view showing a structure of a heater housing and an insulating member constituting the embodiment of the present disclosure.

FIG. 22 is an exploded-perspective view showing a structure of the heater housing 220 and the insulating member 230.

As shown in the drawing, the heater housing 220 may have a rectangular box shape with an open upper portion, and a heater net 224 may be formed at a bottom surface of the heater housing 220.

As shown in the drawing, the heater net 224 may preferably have a net shape with a plurality of vertical through holes. The above described structure is to efficiently transmit radiant heat of the heater 210 provided in the heater housing 220 to the lower space through the bottom surface of the heater housing 220.

As shown in the drawing, the insulating member 230 may have an insulation hole 234 vertically perforated therein so as to have a rectangular frame shape, and when the moving assembly 200 is recovered to an upper end of the cooking chamber 12 as the original position, the insulating member 230 shields the gap between the protection cover 320 and the fixed frame 330 to prevent outward leakage of electromagnetic waves, etc.

A size of the insulating member 230 may be preferably formed larger than an inner diameter of the upper hole 312 and the protection hole 325. In other words, a left-right and front-rear exterior size of the rectangular insulating member 230 may be formed larger than a front-rear and left-right size of the inner diameter of each of the upper hole 312 and the protection hole 325, and when the moving assembly 200 is recovered to the original position at the upper end of the cooking chamber 12, preferably, the insulating member 230 and the upper plate 310 may be partially overlapped with each other so that the electromagnetic waves in the cooking chamber 12 are prevented from leaking outward.

Figure 23:
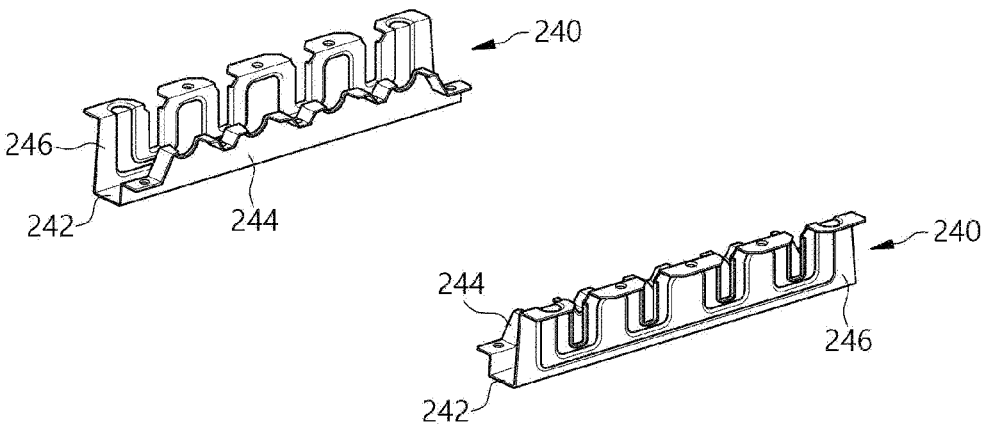
FIG. 23 is a perspective view showing a structure of a support end of the moving assembly constituting the embodiment of the present disclosure.

FIG. 23 is a perspective view showing a structure of the support ends 240 of the moving assembly 200.

As shown in the drawing, the pair of support ends 240 may be installed to be transversally symmetrical to each other, and preferably, the pair of support ends 240 supports the plurality of heaters 210 and allows the moving assembly 200 to be coupled to the lower end of the link assembly 400.

Therefore, each of the support ends 240 may include a bottom support part 242, a heater seating part 244, and a link connection part 246, and the bottom support part 242 may be closely fixed to an upper surface of the bottom surface of the heater housing 220, the heater seating part 244 may protrude upward from one end of the bottom support part 242 and support the heater 210, and the link connection part 246 may extend by being perpendicularly bent from another end of the bottom support part 242 upward.

The link connection part 246 may be formed in size larger than a vertical height of the heater seating part 244 as shown in the drawing, and a lower end of the link frame 450 of the link assembly 400 may be closely fixed on an upper end of the link connection part 246.

The heater seating part 244 may have grooves depressed downward to allow the heaters 210 to pass through the grooves or to support the heaters 210, and the heater brackets 212 may be fixed to the grooves.

Figure 24:
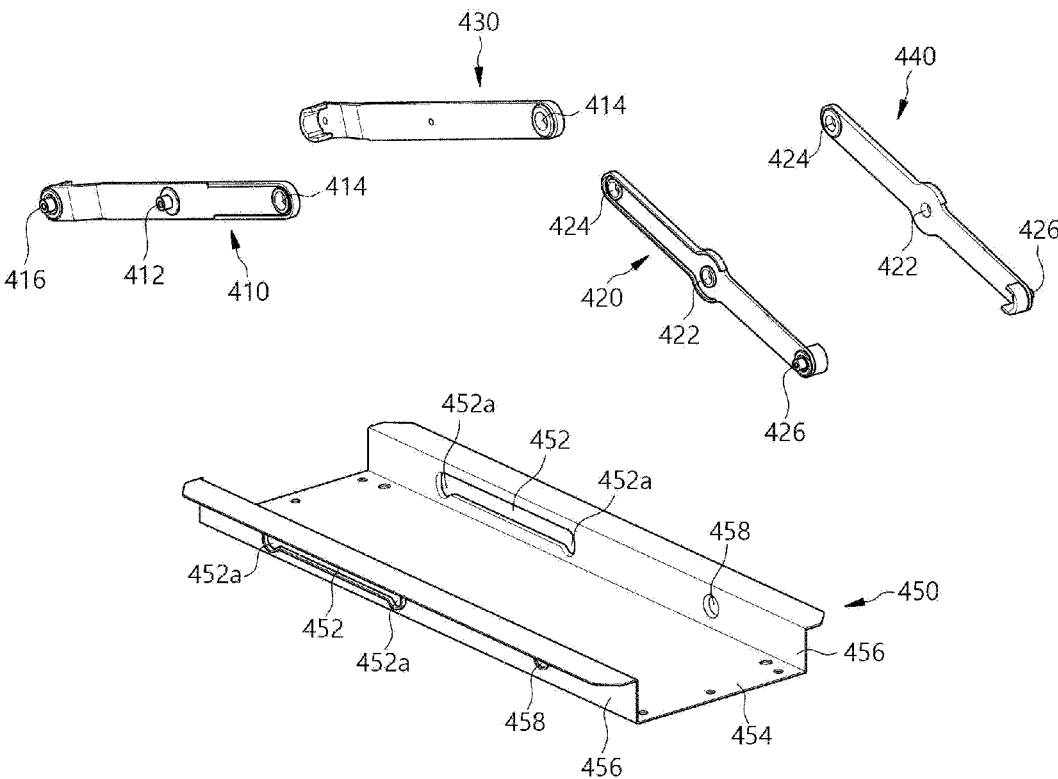
FIG. 24 is an exploded-perspective view showing a main structure of the link assembly constituting the embodiment of the present disclosure.

FIG. 24 is an exploded-perspective view showing a main structure of the link assembly 400.

As shown in the drawings, the front first link 410 and the front second link 420 may rotatably cross to each other into a 'X'-shape on the center portions thereof, and the rear first link 430 and the rear second link 440 may rotatably cross to each other into a 'X'-shape on the center portions thereof.

Therefore, a link center shaft 412 and a link center hole 422 may be respectively formed at the center portions of the front first link 410 and the front second link 420, and the link center shaft 412 and the link center hole 422 may have shapes corresponding to each other and be rotatably coupled to each other. As shown in the drawing, in the present disclosure, the case in which the link center shaft 412 is formed in the front first link 410 and the link center hole 422 is formed in the front second link 420 is illustrated. In other words, the link center shaft 412 may protrude forward or rearward from a center portion of the front surface or the rear surface of the front first link 410, and the link center hole 422 may be formed on the center portion of the front second link 420 by being perforated forward and rearward, so that the link center shaft 412 of the front first link 410 may be rotatably installed by being inserted into the link center hole 422 of the front second link 420.

Likewise, the link center shaft 412 and the link center hole 422 may be respectively formed in the center portions of the rear first link 430 and the rear second link 440, and the link center shaft 412 and the link center hole 422 may have the shapes corresponding to each other and be rotatably coupled to each other. As shown in the drawing, in the present disclosure, the case in which the link center shaft 412 is formed in the rear first link 430 and the link center hole 422 is formed in the rear second link 440 is illustrated.

First link holes 414 may be respectively formed in upper ends of the front first link 410 and the rear first link 430 by being perforated forward and rearward, and the right upper link shafts 557 of the fixed bracket 550 may be rotatably inserted into and coupled to the first link holes 414.

Second link holes 424 may be respectively formed in upper ends of the front second link 420 and the rear second link 440 by being perforated forward and rearward, and the left upper link shafts 566 of the moving bracket 560 may be rotatably inserted into and coupled to into the second link holes 424.

First link protrusions 416 may protrude forward or rearward from lower ends of the front first link 410 and the rear first link 430, and the first link protrusions 416 may be connected to the link frame 450.

Second link protrusions 426 may protrude forward or rearward from lower ends of the front second link 420 and the rear second link 440, and the second link protrusions 426 may be connected to the link frame 450.

The link frame 450 may include a bottom part 454, link connection ends 456, etc., as shown in the drawing, and the bottom part 454 may consist of a flat plate having a predetermined thickness, and the link connection ends 456 may extend by being perpendicularly bent upward from a front end and a rear end of the bottom part 454.

The lower ends of the front first link 410 and the rear first link 430 and the lower ends of the front second link 420 and the rear second link 440 may be rotatably coupled to the link connection ends 456, respectively.

As shown in the drawing, the first link protrusion holes 452 may be formed in left half parts of the link connection ends 456 by being perforated forward and rearward, the first link protrusions 416 formed in the lower ends of the front first link 410 and the rear first link 430 may be accommodated therein.

As shown in the drawing, preferably, the first link protrusion holes 452 may be formed to have predetermined transverse lengths, and preferably, the first link protrusions 416 may be transversally movable while being accommodated in the first link protrusion holes 452.

First link protrusion grooves 452*a* may be respectively formed by being depressed downward from left and right ends of each of the first link protrusion holes 452. The first link protrusion grooves 452*a* maintains a situation in which the moving assembly 200 moves vertically and then is temporarily stopped, and serves as a portion where the first link protrusions 416 temporarily stay.

As shown in the drawing, second link protrusion holes 458 may be formed in right half portions of the link connection ends 456 by being perforated forward and rearward, and the second link protrusions 426 formed in the lower ends of the front second link 420 and the rear second link 440 may be accommodated therein.

According to the above structure, the second link protrusions 426 maintain the state of being accommodated in the second link protrusion holes 458, and the first link protrusions 416 are transversally rotatable while being accommodated in the first link protrusion holes 452, so that the lower ends of the front first link 410 and the rear first link 430 may move closer to or away from the lower ends of the front second link 420 and the rear second link 440 and thus the link connection ends 456 may move vertically.

Hereinbelow, the operation of the cooking appliance according to the present disclosure having the above-described structure will be described with reference to the accompanying drawings.

First, as shown in FIG. 1, before cooking starts with the movable heater system 100 installed at the upper surface of the casing 10, as shown in FIGS. 2 to 7, the moving assembly 200 of the movable heater system 100 may be located at the upper end of the cooking chamber 12.

Therefore, at this time, since the moving assembly 200 is raised to the upper side, the first link protrusions 416 of the front first link 410 and the rear first link 430 may be located at left ends of the first link protrusion holes 452 of the link frame 450.

In this state, when the lead nut 530 moves gradually rightward in response to rotation (forward rotation) of the motor 510, the upper ends of the front first link 410 and the front second link 420 and the upper ends of the rear first link 430 and the rear second link 440 may move closer to each other, so that the moving assembly 200 may move to the lower space in the cooking chamber 12.

Meanwhile, when the moving assembly 200 crashes with the food in the cooking chamber 12 while being lowered in the cooking chamber 12, the moving assembly 200 can no longer be lowered, so that the lead nut 530 may be restrained. As described above, when the motor 510 continues forward rotation and movement of the lead nut 530 stops, tension is generated in the connection coupling 540 in response to rotation of the lead screw 520, and the left end of the lead screw 520 may stretch leftward.

When the left end of the lead screw 520 moves leftward by a predetermined distance, the protection switch 370 installed adjacent to the lead screw 520 is operated so that the rotation of the motor 510 stops. By the above-described process, a damage to the parts such as the connection coupling 540 in addition to the food in the cooking chamber 12 is prevented.

Of course, at this time, it is possible that the motor 510 performs reverse rotation to control the moving assembly 200 so that the moving assembly 200 is raised.

The movable heater system 100 with the moving assembly 200 moving downward below the upper plate 310 and lowered into the inside space of the cooking chamber 12 is shown in FIGS. 8 to 11.

At this time, the first link protrusions 416 of the front first link 410 and the rear first link 430 may be located at the right ends of the first link protrusion holes 452 of the link frame 450.

When the moving assembly 200 is lowered inside the cooking chamber 12, the heaters 210 may move closer to the food inside the cooking chamber 12 so that cooking of the food can be performed more rapidly.

When the cooking is completed in the above-described state, the moving assembly 200 may be raised and be recovered to the original position thereof. For raising of the moving assembly 200, the motor 510 should be controlled to perform reverse rotation, and when the lead nut 530 is moves gradually leftward by the reverse rotation of the motor 510, the upper ends of the front first link 410 and the front second link 420 and the upper ends of the rear first link 430 and the rear second link 440 may move away from each other so that the moving assembly 200 may move upward of the cooking chamber 12 and be recovered to the original position.

The position member 470, the position switch 390, etc. may detect whether or not the moving assembly 200 is raised and recovered to the original position thereof. when the gap between the insulating member 230 of the moving assembly 200 and the upper plate 310 is less than or equal to a preset gap, the upper end of the position member 470 provided in the moving assembly 200 may operate the position switch 390 so that the motor 510 may be controlled to stop.

By the control, a crash between or damages to the upper plate 310 and the insulating member 230 can be prevented and leakage of electromagnetic waves via the gap between the upper plate 310 and the insulating member 230 can be prevented.

Furthermore, only when the moving assembly 200 is recovered to the original position thereof by the position switch 390, use of electromagnetic waves of the cooking appliance is controlled to be possible. Therefore, when the moving assembly 200 is lowered downward into the cooking chamber 12, since the use of electromagnetic waves of the cooking appliance is blocked, so that the leakage of electromagnetic waves is prevented.

The scope of the present disclosure is not limited to the above illustrated embodiment, and those skilled in the art will appreciate that various modifications, additions and substitutions based on the present disclosure are possible, without departing from the scope and spirit of the present disclosure.

What is claimed is:

1. A cooking appliance comprising:
   a cooking chamber;
   a movable assembly disposed above the cooking chamber and supporting a heater, the movable assembly being configured to move downward from an original position into the cooking chamber and to return upward to the original position;
   a driver configured to move the movable assembly between the original position and a heating position in the cooking chamber;
   a shielding structure disposed around an opening through which the movable assembly passes, the shielding structure including multiple shielding members arranged such that, when the movable assembly is returned to the original position, the shielding members cooperate to close the opening and suppress microwave leakage from the cooking chamber;
   an original-position detector configured to detect whether the movable assembly has returned to the original position;
   a contact/overload detector configured to detect abnormal contact or overload of the movable assembly during downward movement toward food in the cooking chamber;
   and a controller configured to:
   (i) stop the driver in response to the contact/overload detector detecting the abnormal contact or overload; and
   (ii) inhibit microwave heating unless the original-position detector detects that the movable assembly is in the original position with the shielding structure closing the opening.

2. The cooking appliance of claim 1, wherein the movable heater system comprises:
   a link assembly movably connecting the movable assembly to a fixed assembly.

3. The cooking appliance of claim 1, wherein the fixed assembly comprises:
   a moving controller configured to restrain the movable assembly so that the movable assembly moves upward and downward.

4. The cooking appliance of claim 3, wherein the moving controller comprises:
   a motor generating a rotation power, a lead screw provided at one portion of the motor and configured to be rotated in conjunction with rotation generated by the motor, and a lead nut fastened to the lead screw by screwing.

5. The cooking appliance of claim 4, wherein a connection coupling is provided between the motor and the lead screw to connect one end of the lead screw to a motor shaft.

6. The cooking appliance of claim 4, wherein the motor is provided at a fixed bracket securely mounted to the fixed assembly, and the lead nut is mounted to a moving bracket movably provided at the fixed assembly.

7. The cooking appliance of claim 3, wherein the fixed assembly comprises:
   an upper plate providing an upper surface of the cooking chamber;
   a protection cover provided at the upper plate, and shielding electromagnetic waves through a gap between the moving assembly and the fixed assembly; and a fixed frame provided above the upper plate, and supporting the moving controller.

8. The cooking appliance of claim 7, wherein the fixed frame is provided above the upper plate to be spaced apart therefrom by a fixed guide, and a gap of a predetermined size is provided between the fixed frame and the protection cover.

9. The cooking appliance of claim 7, wherein the fixed frame is provided above the upper plate to be spaced apart therefrom by a fixed guide, and a gap of a predetermined size is provided between the fixed frame and the protection cover.

10. The cooking appliance of claim 7, wherein the protection cover comprises:
    a plurality of guide members configured to guide vertical movement of the moving assembly.

11. The cooking appliance of claim 7, wherein the protection cover comprises:
    a plurality of guide members configured to guide vertical movement of the moving assembly.

12. The cooking appliance of claim 2, wherein the link assembly comprises a structure including at least one link, and an upper end thereof is rotatably connected to the fixed assembly and a lower end thereof is rotatably connected to the movable assembly.

13. The cooking appliance of claim 2, wherein the link assembly comprises a pair of front links and a pair of rear links, and the pair of front links are provided to be spaced apart from the pair of rear links at a predetermined distance forward and rearward.

14. The cooking appliance of claim 13, wherein a link frame is provided below lower ends of the front links and the rear links, the link assembly being coupled to the movable assembly, and at least one of left and right lower ends of each of the front links and the rear links is movable while being coupled to the link frame.

15. The cooking appliance of claim 1, wherein an original position detector and a contact detector are provided at one portion of the fixed assembly, the original position detector being configured to detect an original position of the movable assembly, and the contact detector being configured to detect whether or not a lower end of the movable assembly is brought into contact with food in the cooking chamber.

* * * * *